(12) United States Patent
Yoshii et al.

(10) Patent No.: US 7,245,339 B2
(45) Date of Patent: Jul. 17, 2007

(54) TRANSFLECTIVE FILM AND LIQUID CRYSTAL DISPLAY DEVICE

(75) Inventors: Katsumasa Yoshii, Fukushima-ken (JP); Mitsuru Kano, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/802,184

(22) Filed: Mar. 17, 2004

(65) Prior Publication Data
US 2004/0189903 A1 Sep. 30, 2004

(30) Foreign Application Priority Data
Mar. 25, 2003 (JP) .............................. 2003-083327

(51) Int. Cl.
*G02F 1/1335* (2006.01)
(52) U.S. Cl. ..................................................... 349/114
(58) Field of Classification Search ................. 349/114
See application file for complete search history.

(56) References Cited

U.S. PATENT DOCUMENTS

| | | | |
|---|---|---|---|
| 6,191,835 B1* | 2/2001 | Choi ........................... | 349/106 |
| 6,380,995 B1* | 4/2002 | Kim ............................ | 349/113 |
| 6,522,377 B2* | 2/2003 | Kim et al. ................... | 349/114 |
| 6,693,697 B2* | 2/2004 | Sakamoto et al. .......... | 349/138 |
| 6,697,138 B2* | 2/2004 | Ha et al. ..................... | 349/114 |
| 6,717,638 B1* | 4/2004 | Kim ............................ | 349/106 |
| 6,727,964 B2* | 4/2004 | Tanaka et al. .............. | 349/106 |
| 6,762,082 B2* | 7/2004 | Yamazaki et al. .......... | 438/158 |
| 6,798,473 B2* | 9/2004 | Kaneda et al. .............. | 349/106 |
| 6,831,718 B2* | 12/2004 | Wei et al. ................... | 349/114 |
| 6,853,421 B2* | 2/2005 | Sakamoto et al. .......... | 349/114 |
| 6,872,586 B2* | 3/2005 | Kiguchi et al. ............. | 438/28 |
| 6,873,382 B2* | 3/2005 | Chang et al. ............... | 349/106 |
| 6,917,393 B2* | 7/2005 | Sakamoto et al. ........... | 349/43 |
| 7,046,315 B2* | 5/2006 | Kim et al. ................... | 349/44 |
| 2005/0094068 A1* | 5/2005 | Ikeno et al. ................. | 349/114 |

FOREIGN PATENT DOCUMENTS

JP   2003-14912   1/2003

* cited by examiner

*Primary Examiner*—James A. Dudek
(74) *Attorney, Agent, or Firm*—Brinks Hofer Gilson & Lione

(57) ABSTRACT

An opening formed on a transflective film is close to the edge of a rectangular pixel region. An interval t2 between three sides of the four sides of the opening and the edge of the pixel region is smaller than the width of one concave portion formed on the transflective film thereby permitting the concave portions that contribute the least to reflection to be minimized, and the reflectance of the transflective film to be maximized. The desired reflection characteristic can be obtained using a predetermined number of concave portions.

17 Claims, 7 Drawing Sheets

TRANSFLECTIVE FILM AND LIQUID CRYSTAL DISPLAY DEVICE

This application claims the benefit of priority to Japanese Patent Application No. 2003-083327, herein incorporated by reference.

BACKGROUND OF THE INVENTION

1. Field of the Invention

The present invention relates to a transflective film and a liquid crystal display device using the same.

2. Description of the Related Art

Since the battery life of portable electronic apparatuses, such as a mobile phone and a portable game device, considerably affect the use thereof, the portable electronic apparatuses are provided with reflective liquid crystal display devices capable of reducing power consumption as display units. For example, the reflective liquid crystal display device comprises a reflector that totally reflects external light incident from the front side of the reflective liquid crystal display device or a reflector that reflects external light incident from the front side of the reflective liquid crystal display device and transmits backlight incident from the backside of the reflective liquid crystal display device. As such a reflector, a reflector, on which a plurality of fine concave portions or convex portions is formed, is widely known in order to maximize the reflectance of light (for example, see Patent Document 1).

[Patent Document 1]

Japanese Unexamined Patent Application Publication No. 2003-14912

In particular, a reflector, which reflects external light incident from the front side of the reflective liquid crystal display device and transmits backlight incident from the backside thereof, is referred to as a transflector. For example, as shown in FIG. 9, a transflective film 101, in which an opening 103 corresponding to each pixel 106 of a liquid crystal display panel is provided in a portion of a thin metallic film having a plurality of fine concave portions (dimples) 102, is used as the transflector. The transflective film 101 transmits light emitted from an illuminating device, such as a backlight, to the liquid crystal display panel through the opening 103 and reflects external light from a reflecting region 104 other than the opening 103 to travel the reflected light to the liquid crystal display panel. In this way, the liquid crystal display panel can be illuminated no matter whether external light or the illuminating device is used as a light source.

When external light incident through the liquid crystal display panel is reflected to the liquid crystal display panel again, the fine concave portions 102 formed on the surface of the transflective film 101 reflect the incident external light effectively in a wide range. As marked by the symbol Q1 in FIG. 9, when a predetermined number of concave portions 102, for example, sixteen concave portions 102 that are arranged in four rows of four concave portions is formed as one unit, the desired reflection characteristics are obtained.

However, in the above-mentioned conventional transflective film 101, since the desired reflection characteristic is obtained using sixteen concave portions 102 that are arranged in four rows of four concave portions as one unit, one or two columns or rows of concave portions 102 situated within an interval t1 in the width direction between the outer circumference 103a of the opening 103 and the edge 106a of the pixel 106 make only a small contribute to reflection. If regions that correspond to one or two columns or rows of concave portions 102 formed around the opening 103 do not contribute to reflection, the liquid crystal display panel is not effectively illuminated by external light, and it is impossible to improve the luminance of the liquid crystal display panel.

SUMMARY OF THE INVENTION

The present invention is designed to solve the above problems, and it is an object of the present invention to provide a transflective film capable of effectively reflecting incident external light and a liquid crystal display device using the same.

To achieve this object, there is provided a transflective film which is formed between a liquid crystal display panel and an illuminating device for illuminating the liquid crystal display panel from the backside of the liquid crystal display panel and in which a plurality of fine concave or convex portions is formed on one surface thereof and openings for transmitting light are formed at positions corresponding to pixels of the liquid crystal display panel, wherein an interval between at least one side of each of the openings and the edge of each of the pixels is smaller than the width of one concave or convex portion.

In the transflective film according to the present invention, the desired reflection characteristic can be obtained using a predetermined number of concave portions as a unit. Therefore, when the interval between the sides of the opening and the edge of the pixel is smaller than the width of one concave portion formed on the transflective film, concave portions that contribute the least to reflection can be minimized. In this way, units of the predetermined number of concave or convex portions, which contribute to the exhibition of the desired reflection characteristic, can be maximized, and the reflectance of the transflective film can be maximized.

The interval is preferably set in the range of 0.1 to 5.0 µm. In addition, according to a liquid crystal display device comprising the transflective film, an illuminating device, and a liquid crystal display panel, no matter whether external light or the illuminating device is used as a light source, it is possible to provide a liquid crystal display device capable of perform clear display with high luminance.

DESCRIPTION OF THE PREFERRED EMBODIMENT

Figure 1:
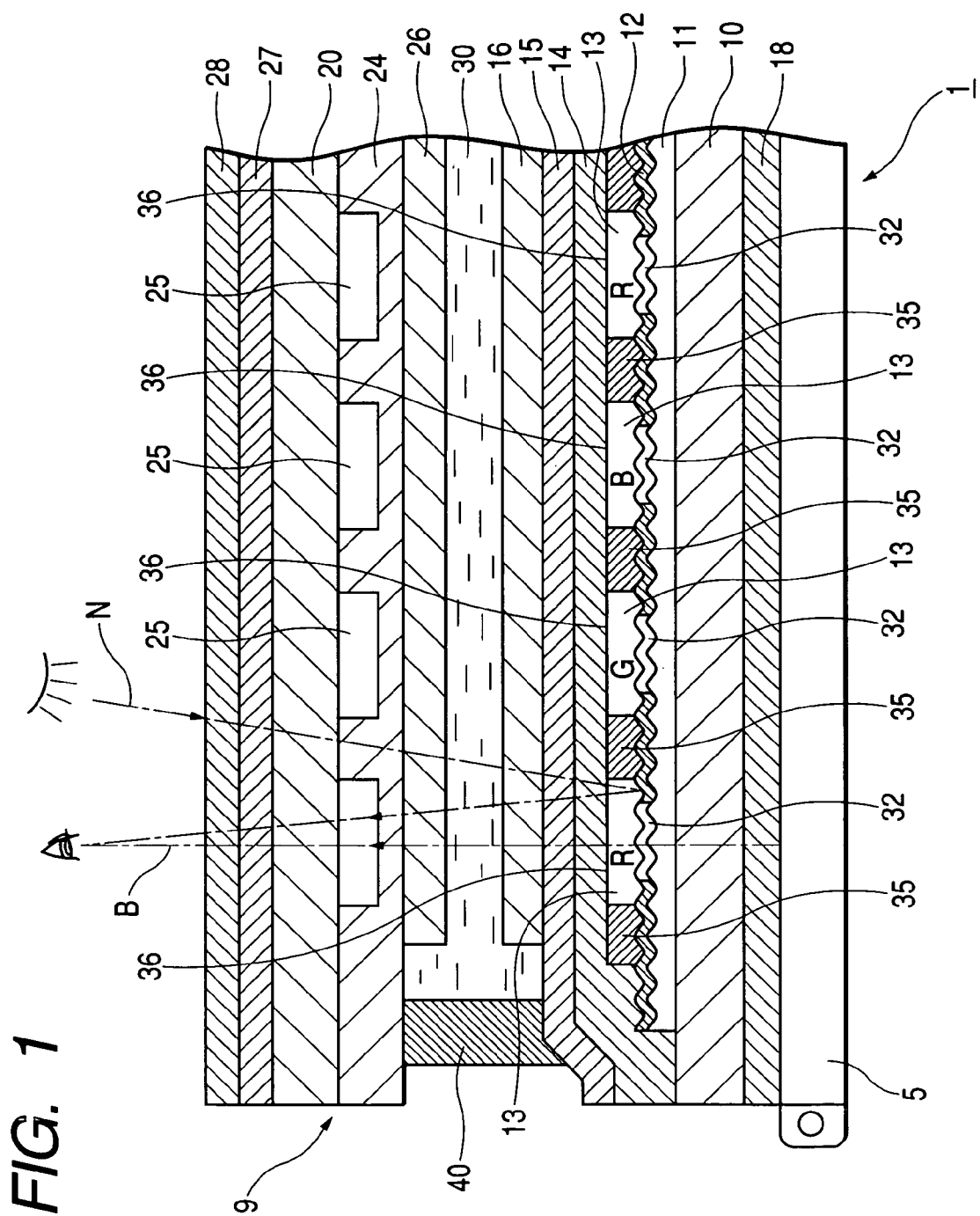
FIG. 1 is a cross-sectional view of a liquid crystal display device having a transflective film according to the present invention.

Preferred embodiments of the present invention will now be described with reference to the drawings. FIG. 1 is an enlarged cross-sectional view schematically showing a liquid crystal display device provided with a transflective film according to the present invention. A liquid crystal display device 1 comprises a liquid crystal display panel 9, in which first and second substrates 10 and 20, which are made of transparent glass and sandwich a liquid crystal layer 30 therebetween, are attached to each other by a ring-shaped sealing material 40, which provided at the circumferential portions of the first and second substrate 10 and 20, to form a single body, and a backlight 5 that is an illuminating device.

An organic film 11 for forming concave portions (dimples) 31 on a reflecting film 12 formed thereon, a transflective film 12 which reflects light incident on the liquid crystal display device 1 and transmits light from a backlight 5, a color filter 13 for performing color display, an overcoat film 14 for coating and protecting the transflective film 12 and the organic film 11 and for planarizing unevenness caused by the organic film 11 and the color filter 13, an electrode layer 15 for driving a liquid crystal layer 30, and an alignment film 16 for controlling the alignment of liquid crystal molecules constituting the liquid crystal layer 30 are sequentially stacked between the liquid crystal layer 30 and the first substrate 10. In addition, an electrode layer 25, an overcoat film 24, and an alignment film 26 are sequentially stacked between the liquid crystal layer 30 and the second substrate 20.

In the color filter 13, for example, the three primary colors R, G, and B may be formed in a repeated pattern. In order to prevent mixed color of light between adjacent color filters 13, a light-shielding wall 35, which is referred to as a black matrix, is formed between the color filters 13. Regions partitioned by the light shielding walls 13 constitute pixel regions 36.

A polarizing plate 18 is provided on one surface of the first substrate 10 (the outer surface of the first substrate 10) opposite to the liquid crystal layer 30, and a phase difference plate 27 and a polarizing plate 28 are sequentially stacked on one surface of the second substrate 20 (the outer surface of the second substrate 20) opposite to the liquid crystal layer 30.

In addition, the backlight 5, functioning as an illuminating device for performing transmissive display in the liquid crystal display device 1, is disposed on the outside of the polarizing plate 18 on the first substrate 10.

The organic film 11 is provided to effectively scatter reflection light by forming concave portions 31 on the transflective film 12 formed thereon. By forming the concave portions 31 on the reflective film 12, external light incident on the liquid crystal display device 1 can be effectively reflected. Thus, bright display can be performed when illuminated by external light reflection.

The transflective film 12 is formed of a thin metallic film having high reflectance, such as aluminum. Openings 32 are formed on the transflective film 12 so as to correspond to the respective pixels of the liquid crystal display panel 9. The openings 32 function to make the light emitted from the backlight (the illuminating device) 5 transmitted into the transflective film 12 composed of a thin metallic film.

According to the above configuration, for example, when external light N is incident on the liquid crystal display panel 9 of the liquid crystal display device 1 in an outdoor environment during the day, the incident external light N is reflected from reflecting regions other than the openings 32 of the transflective film 12 formed of a thin metallic film and illuminates the liquid crystal display panel 9. Meanwhile, in an environment in which external light is insufficient, such as during the night or in a dark indoor environment, when the backlight 5 turns on, illumination light B emitted from the backlight 5 transmits the openings 32 of the transflective film 12 and illuminates the liquid crystal display panel 9. In this way, in the liquid crystal display device 1, the liquid crystal display panel 9 can be illuminated with high luminance by the action of the transflective film 12 no matter whether external light or the backlight 5 is used as a light source.

Figure 2:
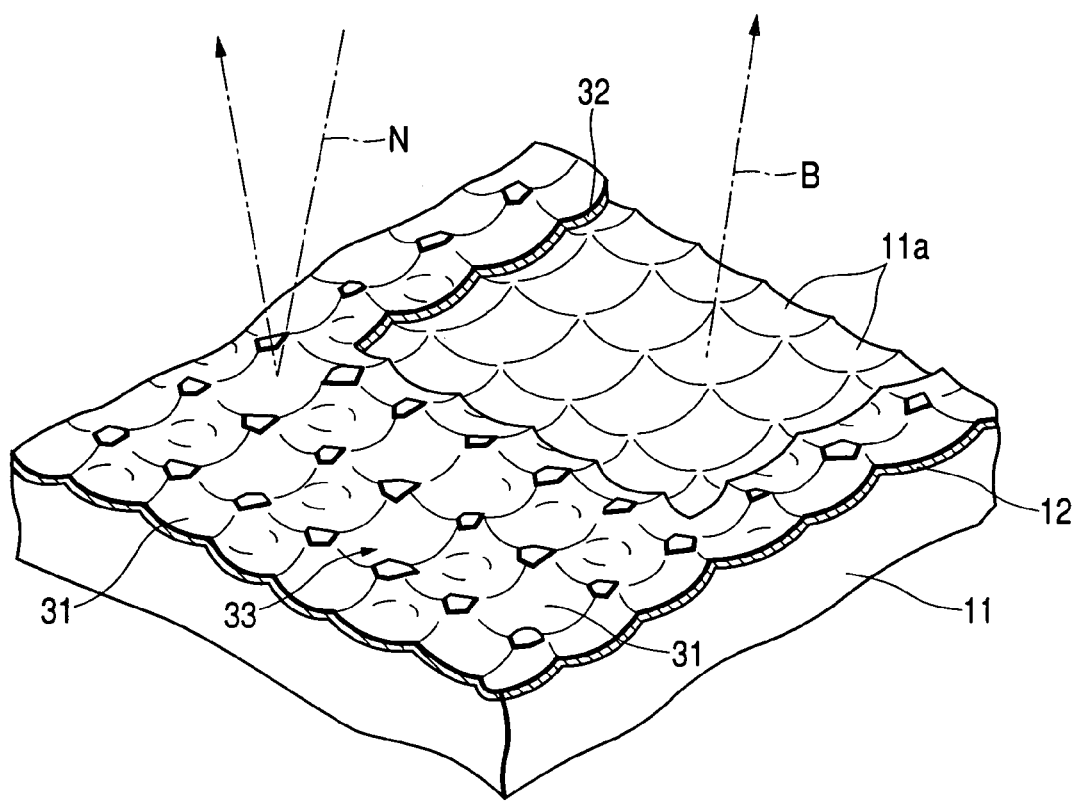
FIG. 2 is an enlarged perspective view of the transflective film shown in FIG. 1.

FIG. 2 is a perspective view illustrating a portion of the organic film 11 and the transflective film 12 formed thereon. As shown in FIG. 2, a plurality of concave portions 11a whose inner surfaces are formed of a hemispherical surface is consecutively formed on the surface of the organic film 11 so as to overlap with each other in the right and left directions, and the transflective film 12 is stacked on the surfaces of the plurality of concave portions 11a. The concave portions 31 are formed on the transflective film 12 by forming the concave portions 11a on the surface of the organic film 11. In addition, rectangular openings 32 are formed on a part of the transflective film 12. The openings 32 may be formed using an etching process, for example.

Preferably, the concave portions 31 are randomly formed in the depth range of 0.1 to 3 μm, for example, the pitch between adjacent concave portions 31 is randomly arranged in the range of 5 to 50 μm, and the inclined angle of the inside of the concave portion 31 is set in the range of −30° to +30°. In particular, it is important that the inclined angle of the inside of the concave portion 31 is set in the range of −30° to +30°, and that the pitch between adjacent concave portions 31 is randomly arranged in all directions in plan view. The reason is that if the pitch between adjacent concave portions 31 is regularly arranged, reflection light is colored due to the interference of light.

In addition, if the inclined angle of the inside of the concave portion 31 exceeds the range of −30° to +30°, the diffusion angle of reflection light is excessively widened, and thus the intensity of reflection light is lowered. Therefore, bright display cannot be performed (the diffusion angle of reflection light is more than 30° in the air, the peak of reflection strength inside the liquid crystal display is lowered, and total reflection loss increases). Moreover, if the depth of the concave portions 31 is more than 3 μm, the top of a convex portion is not buried with a planarization film (the overcoat film 14) when the concave portions 31 are planarized by a subsequent process, and the desired planarization cannot be obtained, causing nonuniform display.

When the pitch between adjacent concave portions 31 is less than 5 μm, there is a limitation in manufacturing a transfer mold used to form the organic film 11, the processing time is lengthened, a shape which optimizes reflection characteristic cannot be formed, and interference light occurs. In addition, practically, when diamond particles having a diameter of 30 to 100 μm are used, preferably, the pitch between adjacent concave portions 31 is 5 to 50 μm.

According to this configuration, it is possible for the transflective film 12 to transmit illumination light B from the backlight 5 through the openings 32 and to effectively reflect external light N from the reflecting region 33 in which a plurality of the concave portions 31 is formed.

Figure 3:
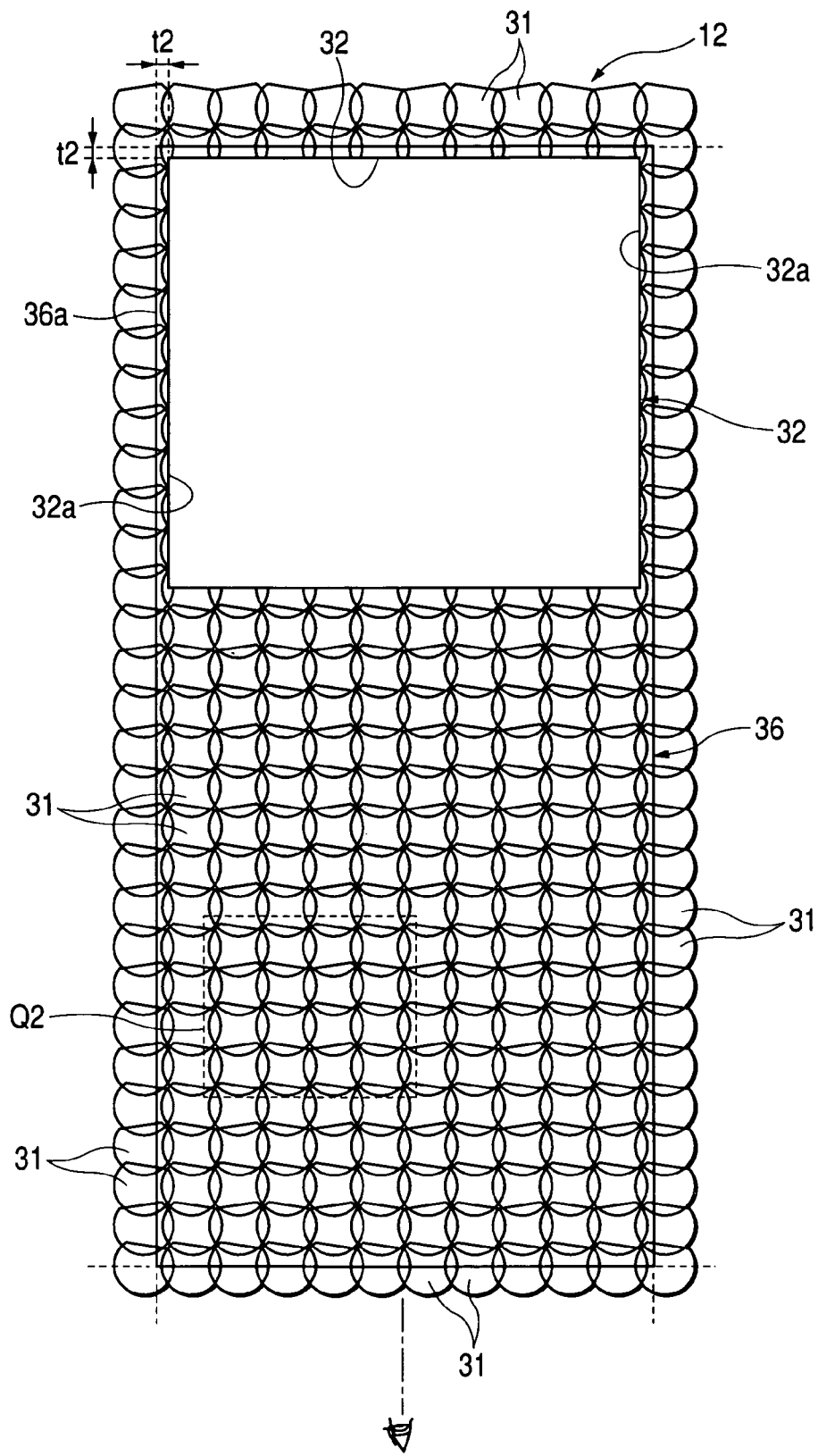
FIG. 3 is an enlarged plan view of one pixel of the transflective film of FIG. 1.

FIG. 3 is an enlarged plan view of one pixel region when the transflective film shown in FIG. 2 is viewed from the top.

The aperture ratio of the opening 32 formed on the transflective film 12 with respect to the surface area of one pixel region 36 is set to, for example, 35%. The opening 32 is formed so as to be close to the edge 36a of the rectangular pixel region 36. An interval t2 between three sides 32a of the four sides of the opening 32 and the edge 36a of the pixel region 36 is smaller than the width of one concave portion 31 formed on the transflective film 12. For example, when the width of the concave portion 31 is 12 to 13 μm, the interval t2 between the three sides 32a of the opening 32 and the edge 36a of the pixel region 36 is preferably set in the range of 0.1 to 5.0 μm, for example.

As marked by the symbol Q2 in FIG. 3, in the transflective film 12, the desired reflection characteristic is obtained using the predetermined number of concave portions 31, for example, sixteen concave portions 31 as a unit in which four rows of four concave portions 31 are arranged. However, when the interval t2 between the sides 32a of the opening 32 and the edge 36a of the pixel region 36 is set such that one to three rows or columns of the concave portions 31 are provided therein, the concave portions 31 provided with the interval t2 do not sufficiently contribute to reflection, thereby lowering reflectance. Accordingly, the interval t2 between the sides 32a of the opening 32 and the edge 36a of the pixel region 36 is set to be smaller than the width of one concave portion 31 formed on the transflective film 12 so that the number of concave portions 31 that contribute the least to reflection is minimized. As such, the number of units of the predetermined number of concave portions 31, for example, sixteen concave portions arranged in four rows of four concave portions 31, can be maximized, and thus the reflectance of the transflective film 12 can be maximized.

Furthermore, the interval t2 between the sides 32a of the opening 32 and the edge 36 of the pixel region 36 may be appropriately selected according to the width of the concave portion 31. In addition, for at least one side 32a of the opening 32, the interval between the sides 32a of the opening 32 and the edge 36a of the pixel region 36 may be closed up to the interval t2. Furthermore, the shape or position of the concave portion or the opening according to the present invention is not limited to the above-described example, but a concave portion having any shape and an opening having any shape may be formed at any position.

Figure 4:
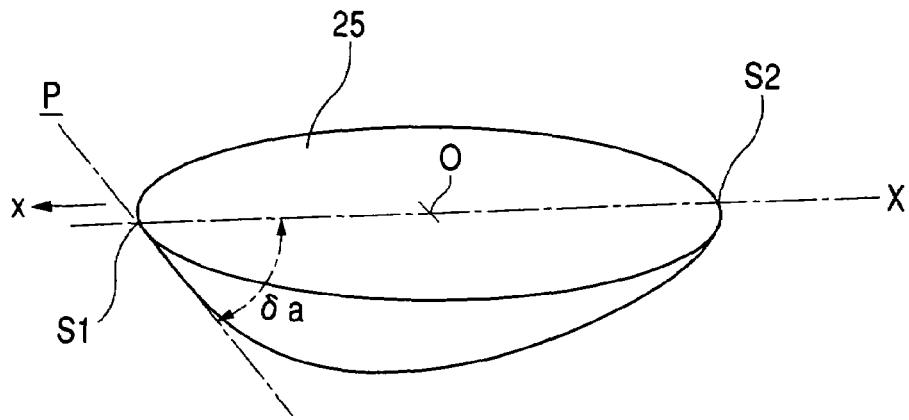
FIG. 4 is a perspective view schematically illustrating a concave portion formed on the transflective film.
Figure 5:
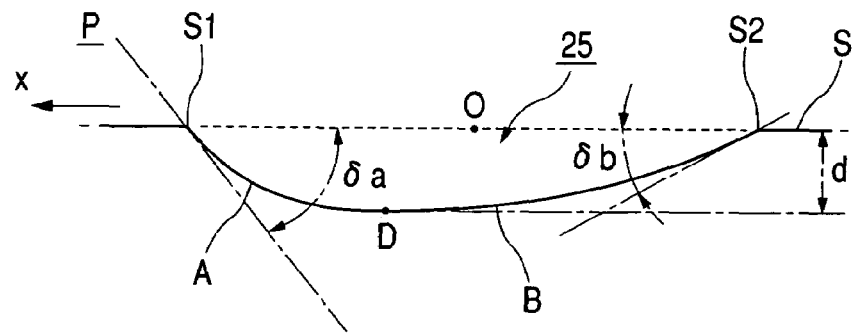
FIG. 5 is a cross-sectional view of the concave portion taken along the longitudinal cross-section X of FIG. 4.

As shown in FIGS. 4 and 5, the shape of the inner surface of the concave portion 31, which is formed on the transflective film 12, taken along a specific longitudinal cross section X is a curve composed of a first curve A linking a circumferential part S1 of the concave portion 31 to a maximum depth point D and a second curve B linking the maximum depth point D of the concave portion 31 to another circumferential part S2 continuously to the first curve A. The first and second curves A and B are connected to each other at the maximum depth point D of the concave portion 31 where the inclined angle with respect to a flat surface S is zero.

The inclined angle of the first curve A with respect to the flat surface S is steeper than the inclined angle of the second curve B. The maximum depth point D deviates from the center O of the concave portion 31 in the x-direction. In other words, the average value of absolute values of the inclined angles of the first curve A with respect to the flat surface S is larger than the average value of absolute values of the inclined angles of the second curve B with respect to the flat surface S. Even in the present embodiment, preferably, the average value of absolute values of the inclined angles of the first curve A constituting each of the concave portions 31 is irregularly distributed in the range of 1 to 89°.

In addition, preferably, the average value of absolute values of the inclined angles of the second curve B constituting each of the concave portions 31 is irregularly distributed in the range of 0.5 to 88°.

The inclined angles of the first and second curves A and B are gently varied from the circumferential part of the concave portion 31 to the maximum depth point D. Thus, the maximum inclined angle δa (an absolute value) of the first curve A shown in FIGS. 4 and 5 is larger than the maximum inclined angle δb of the second curve B. In addition, the inclined angle of the maximum depth point D where the first curve A and the second curve B are connected to each other with respect to the flat surface S is zero, and thus the first curve A and the second curve B that have positive and negative inclined angles are gently and continuously connected to each other at the maximum depth point D.

For example, the maximum inclined angle δa of each of the concave portions 31 is irregularly distributed in the range of 2 to 90°. However, the maximum inclined angles δa of a number of concave portions 31 are irregularly distributed in the range of 4 to 35°. In addition, a concave surface of the concave portion 31 shown in FIGS. 4 and 5 has a single minimum point D (a point on a curve at which the inclined angle is zero). The distance between the minimum point D and the flat surface S is the depth d of the concave portion 31, and the depth d of the plurality of concave portions 31 is irregularly distributed in the range of 1 to 3 μm.

Figure 6:
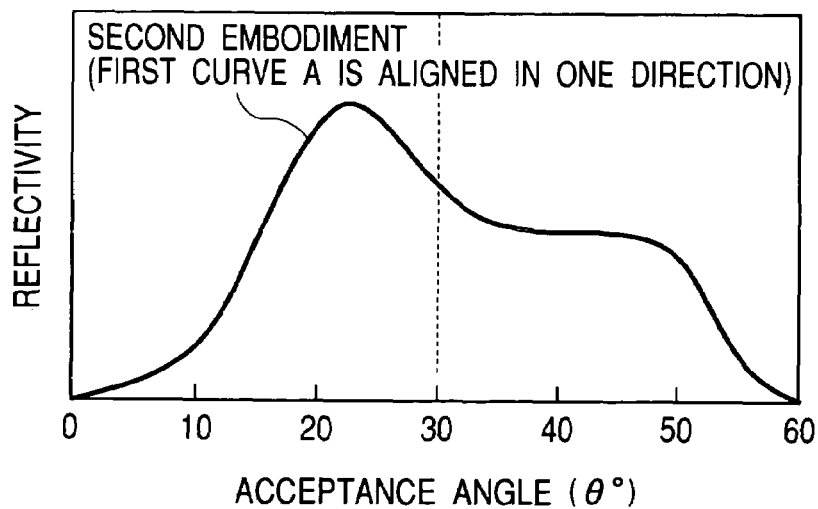
FIG. 6 is a graph illustrating an example of a reflection characteristic of the transflective film.

Preferably, the first curve A of the plurality of concave portions 31 is aligned in a single direction. According to this configuration, the direction of reflection light reflected from the transflective film 12 may be changed from the direction of specular reflection to a specific direction. As a result, in the overall reflection characteristics in a specific longitudinal cross section, reflectance in a direction where light is reflected from the surface around the second curve B increases, and thus a reflection characteristic of focusing reflection light in a specific direction can be obtained. FIG. 6 shows the relationship between an acceptance angle (θ°) and brightness (reflectance) when external light is incident at an incident angle of 30° onto the transflective film, in which the first curve A of the concave portion 31 is aligned in a single direction, and the acceptance angle is varies from a normal line position (0°) of the transflective film to 60°, with an angle of 30°, which is the direction of specular reflection with respect to the flat surface S, used as the center.

As can be seen from FIG. 6, in the transflective film in which the first curve A is aligned in a single direction, a reflection characteristic is high in the wide range of 20 to 50°, and an integral value of reflectance at an acceptance angle that is smaller than an angle of 30°, which is a specular reflection angle with respect to the flat surface S, is larger than an integral value of reflectance at an acceptance angle that is larger than the specular reflection angle. In other words, more intensive reflection strength can be obtained at an acceptance angle of about 20°.

FIG. 7 shows an arrangement example of an opening in each pixel of a transflective film. FIG. 7(a) shows an example in which an opening 52 of a transflective film 51 is arranged in the middle of a pixel 53. In this embodiment, an interval t3 between two sides 52a of the opening 52 and an edge 53a of the pixel 53 is smaller than the width of one concave portion formed on the transflective film 51. In addition, FIG. 7(b) shows an example in which an opening 56 of a transflective film 55 is formed to be close to an edge 57a of a pixel 57 in a longitudinal direction. In this embodiment, an interval t4 between three sides 56a of the opening 56 and the edge 57a of the pixel 57 is smaller than the width of one concave portion formed on the transflective film 55.

Figure 7A:
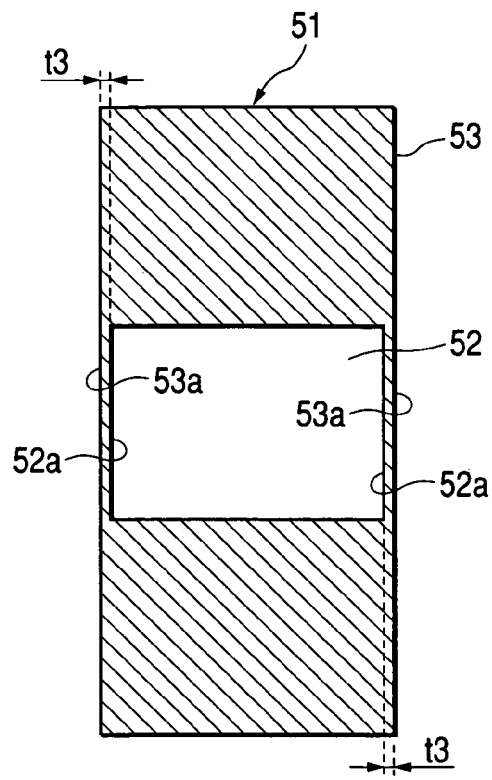
FIGS. 7(a) to 7(d) are plan views of a transflective film according to another embodiment of the present invention.
Figure 7B:
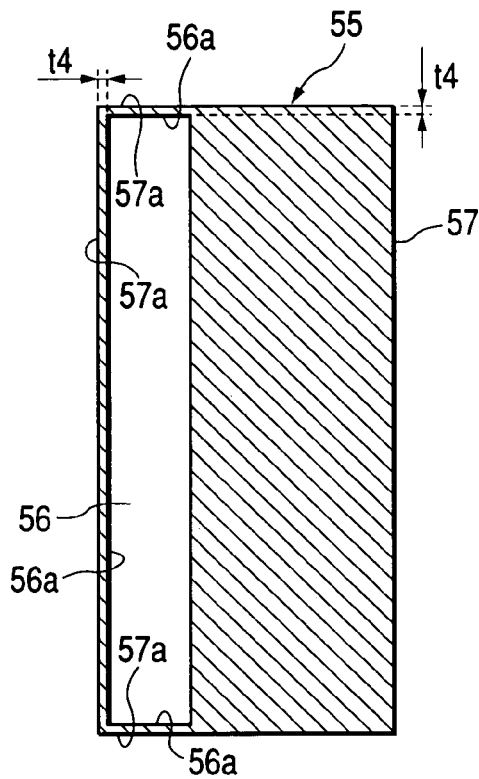
Figure 7C:
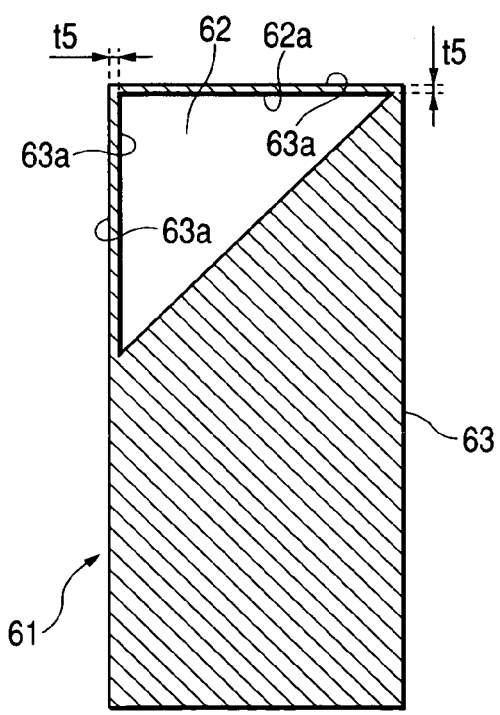
Figure 7D:
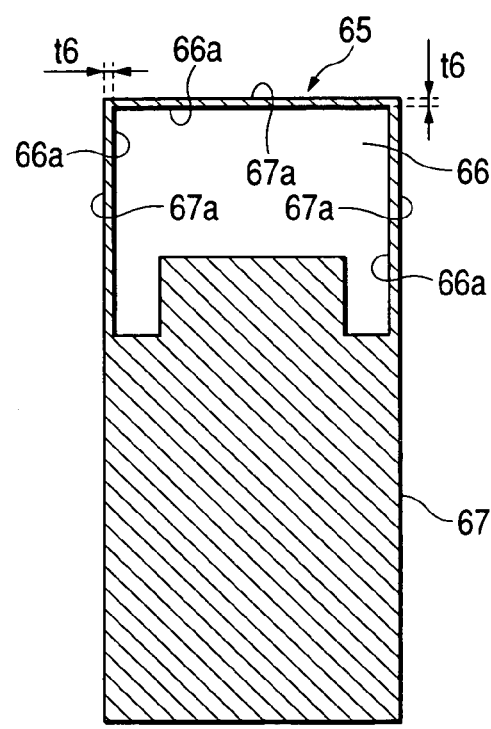

FIG. 7(c) shows an example in which an opening 62 of a transflective film 61 is formed of a triangular shape. In this embodiment, an interval t5 between two sides 62a of the triangular opening 62 and an edge 63a of a pixel 63 is smaller than the width of one concave portion formed on the transflective film 61. In addition, FIG. 7(d) shows an example in which an opening 66 of a transflective film 65 is formed of an inversely concave shape. In this embodiment, an interval t6 between three sides 66a of the inversely concave opening 66 and an edge 67a of a pixel 67 is smaller than the width of one concave portion formed on the transflective film 65. In any embodiment, the interval between the sides of the opening and the edge of the pixel is smaller than the width of one concave portion formed on the transflective film. Therefore, concave portions that contribute the least to reflection can be minimized, and thus the reflectance of the transflective film can be maximized.

Figure 8:
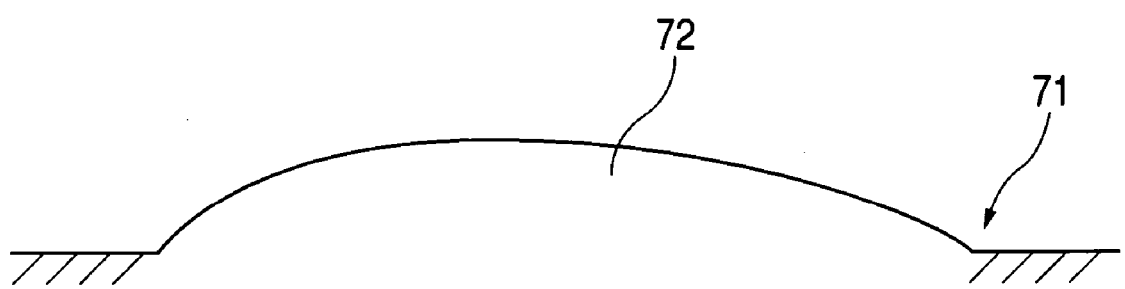
FIG. 8 is a plan view of the transflective film according to another embodiment of the present invention.
Figure 9:
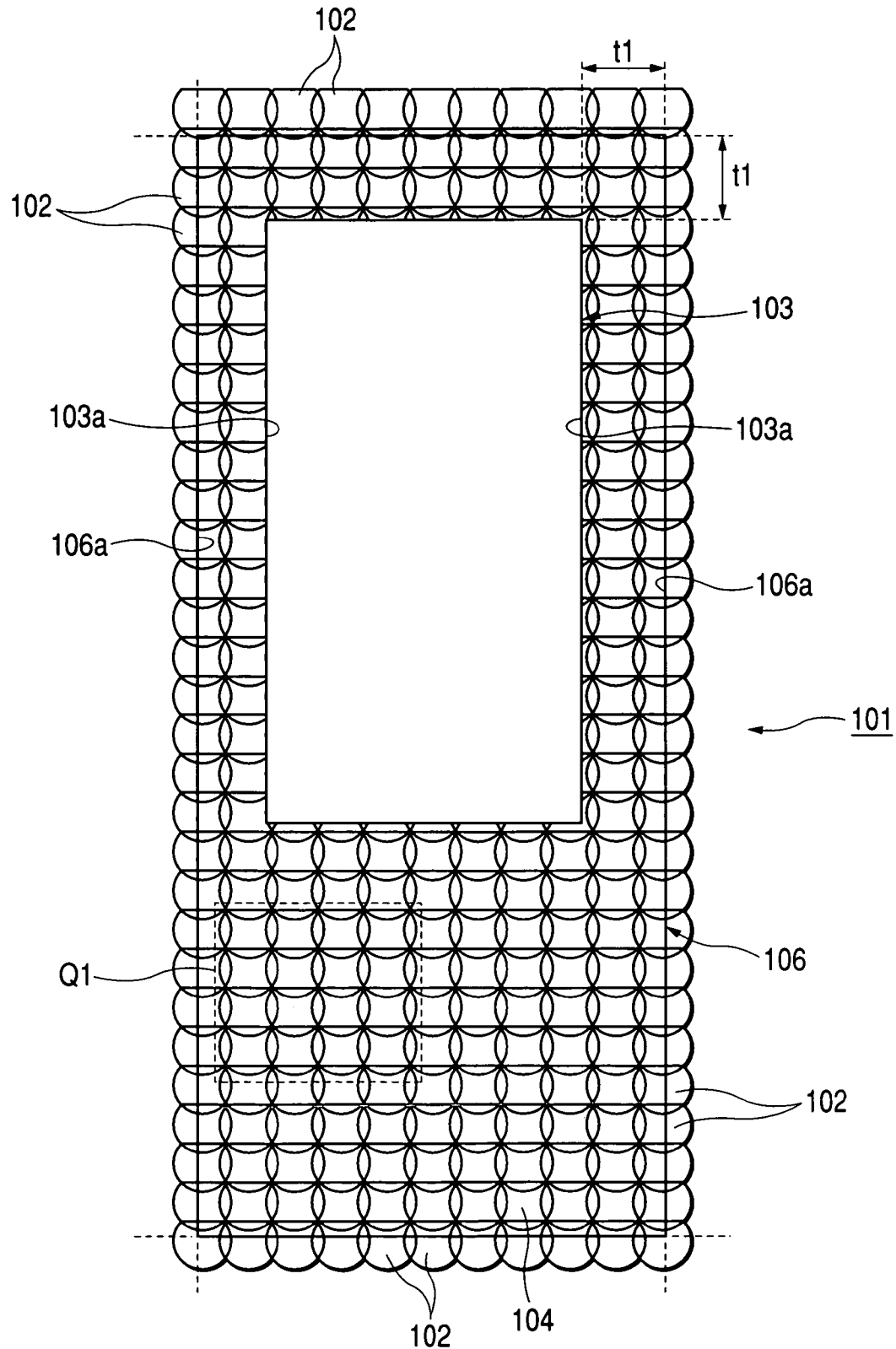
FIG. 9 is an enlarged plan view of a conventional transflective film.

Furthermore, according to the above-described embodiments, the concave portions are formed on the transflective film. However, for example, as shown in FIG. 8, even if a plurality of fine convex portions 72 is formed on the surface of a transflective film 71, the same effects can be obtained.

As described above, in the transflective film according to the present invention, the desired reflection characteristic can be obtained using a predetermined number of concave portions as a unit. However, an interval between the sides of an opening and the edge of a pixel is smaller than the width of one concave portion formed on the transflective film, and thus concave portions that contribute the least to reflection can be minimized. In this way, units of the predetermined number of concave portions, which contribute to the exhibition of the desired reflection characteristic, can be maximized, and the reflectance of the transflective film can be maximized.

Preferably, the interval is set in the range of 0.1 to 5.0 µm. In addition, in a liquid crystal display device comprising the transflective film, an illuminating device, and a liquid crystal display panel, no matter whether external light or the illuminating device is used as a light source, it is possible to provide a liquid crystal display device capable of perform clear display with high luminance.

What is claimed is:

1. A transflective film which is formed between a liquid crystal layer and an illuminating device for illuminating a liquid crystal display panel from a backside of the liquid crystal display panel and in which a plurality of fine concave or convex portions is formed on one surface thereof and openings for transmitting light are formed at positions corresponding to pixel regions of the liquid crystal display panel,
wherein the pixel regions are partitioned by light-shielding walls,
wherein an interval between at least one side of each of the openings and an edge of the light shielding walls is smaller than a width of one concave or convex portion, and
wherein a ratio of the interval to a width of the concave portion is in the range of 1/130 to 5/12.

2. The transflective film according to claim 1, wherein the interval is set in the range of 0.1 to 5.0 µm.

3. A liquid crystal display comprising the transflective film according to claim 1, an illuminating device, and a liquid crystal display panel.

4. The traneflective film according to claim 1, wherein the pixels are divided by light-shielding walls disposed on the transflective film.

5. The transflective film according to claim 1, wherein each of the intervals between at least two sides of each of the openings and at least two edges of each of the pixels is smaller than the width of one concave and convex portion.

6. The transflective film according to claim 5, wherein each of the openings has a substantially rectangular shape.

7. The tranaflective film according to claim 6, wherein each of the openings is formed in a middle of each of the pixels, and each of the intervals between opposing sides of each of the openings and opposing edges of each of the pixels is smaller than the width of one concave or convex portion.

8. The transflective film according to claim 6, wherein each of the openings is substantially closer to one edge of the pixel than to an opposing edge of the pixel in a longitudinal direction of the pixel.

9. The transflective film according to claim 6, wherein three sides of each of the openings are more proximate to the edges of each of the pixels than at least one other side of the opening, and wherein each of the intervals between the three sides of each of the openings and the edge of each of the pixels is smaller than the width of one concave and convex portion.

10. The transflective film according to claim 5, wherein each of the openings has a substantially triangular shape.

11. The transflective film according to claim 5, wherein each of the openings has a substantially rectangular polygonal shape with greater than four sides.

12. A liquid crystal display comprising:
a liquid crystal display panel which comprises first and second substrates, a liquid crystal layer between the first and second substrates, and a sealing material which is formed at a circumferential portion of the first and second substrates to form a single body;
an illuminating device for illuminating the liquid crystal display panel from a backside of the liquid crystal display panel; and
wherein a transflective film which is formed between the liquid crystal layer and the illuminating device,
wherein a plurality of fine concave or convex portions is formed on one surface of the transflective film,
wherein openings for transmitting light are formed at positions corresponding to pixel regions of the liquid crystal display panel,
wherein an interval between at least one side of each of the openings and an edge of each of the pixel regions is smaller than a width of one concave or convex portion,
wherein the pixel regions are partitioned by light shielding walls, and
wherein a ratio of the interval to a width of the concave portion is in the range of 1/130 to 5/12.

13. The liquid crystal display according to claim 12, wherein the each pixel is divided by light-shielding walls, which are on the transflective film.

14. The liquid crystal display according to claim 12, wherein a color filter is formed above both the opening and the transflective film in the each pixel.

15. The transflective film according to claim 1, wherein the light shielding walls are black matrix.

16. The transflective film according to claim 1, wherein the pixel regions are directly disposed on the openings.

17. The transflective film according to claim 1, wherein a color filter is disposed in the pixel regions.

* * * * *